United States Patent [19]
Fukuda et al.

[11] Patent Number: 5,753,067
[45] Date of Patent: May 19, 1998

[54] TRANSVERSE SEALER FOR A BAG MAKER WITH VARIABLE OPERATING SPEED

[75] Inventors: Masao Fukuda; Masashi Kondo; Yukio Nakagawa, all of Shiga, Japan

[73] Assignee: Ishida Co., Ltd., Kyoto, Japan

[21] Appl. No.: 575,331

[22] Filed: Dec. 20, 1995

[30] Foreign Application Priority Data

Dec. 23, 1994 [JP] Japan .................. 6-336097

[51] Int. Cl.⁶ .................. B32B 31/00; G05G 15/00
[52] U.S. Cl. .................. 156/358; 156/359; 156/361; 156/366; 156/439; 156/515; 53/374.6; 53/451; 53/479; 53/552
[58] Field of Search .................. 156/353, 358, 156/359, 361, 366, 436, 439, 515, 526; 53/374.5, 374.6, 451, 477, 478, 479, 551, 552

[56] References Cited

U.S. PATENT DOCUMENTS

| | | | |
|---|---|---|---|
| 4,663,917 | 5/1987 | Taylor et al. | 53/552 |
| 4,750,313 | 6/1988 | Kammler et al. | 53/451 |
| 4,751,808 | 6/1988 | Hadden | 53/451 |
| 5,279,098 | 1/1994 | Fukuda | 53/451 |
| 5,347,795 | 9/1994 | Fukuda | 53/552 |
| 5,377,474 | 1/1995 | Kovacs et al. | 53/451 X |
| 5,485,712 | 1/1996 | Cherney et al. | 53/436 |

FOREIGN PATENT DOCUMENTS

| | | |
|---|---|---|
| 0165818 | 8/1989 | European Pat. Off. . |
| 0560988 | 10/1992 | European Pat. Off. . |

*Primary Examiner*—David A. Simmons
*Assistant Examiner*—Paul M. Rivard
*Attorney, Agent, or Firm*—Keiichi Nishimura

[57] ABSTRACT

A bag maker bends an elongated flexible bag-making film into a tubular form and transversely seals it by a transverse sealer while filling it with articles to produce packaged bags. The transverse sealer has two seal jaws at both sides of the film being pulled downwards. The seal jaws are each caused to move in a generally D-shaped trajectory with a vertically straight portion where they move along the film, sandwiching it therebetween. The seal jaws are operated so as to move faster than the film while on the top half of the straight portion of the trajectory where stripping takes place and more slowly than the film while on the bottom half of the straight portion such that the film will blouse to make it easier for articles to drop deeper inside the bag being produced. The speed of each seal jaw on the arcuate part of its trajectory is adjusted such that the period of the cyclic motion of the seal jaws need not be modified.

13 Claims, 8 Drawing Sheets

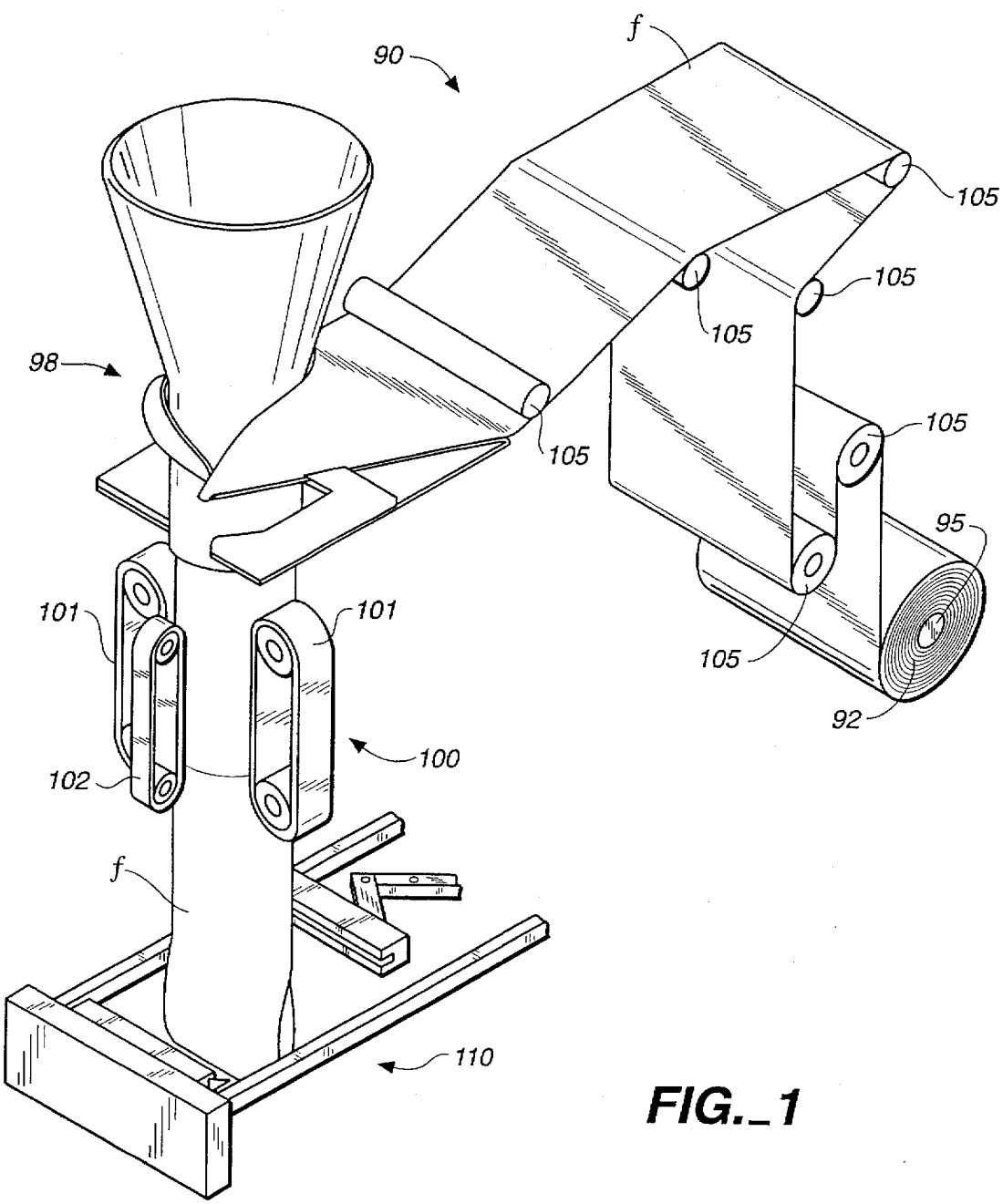
FIG._1

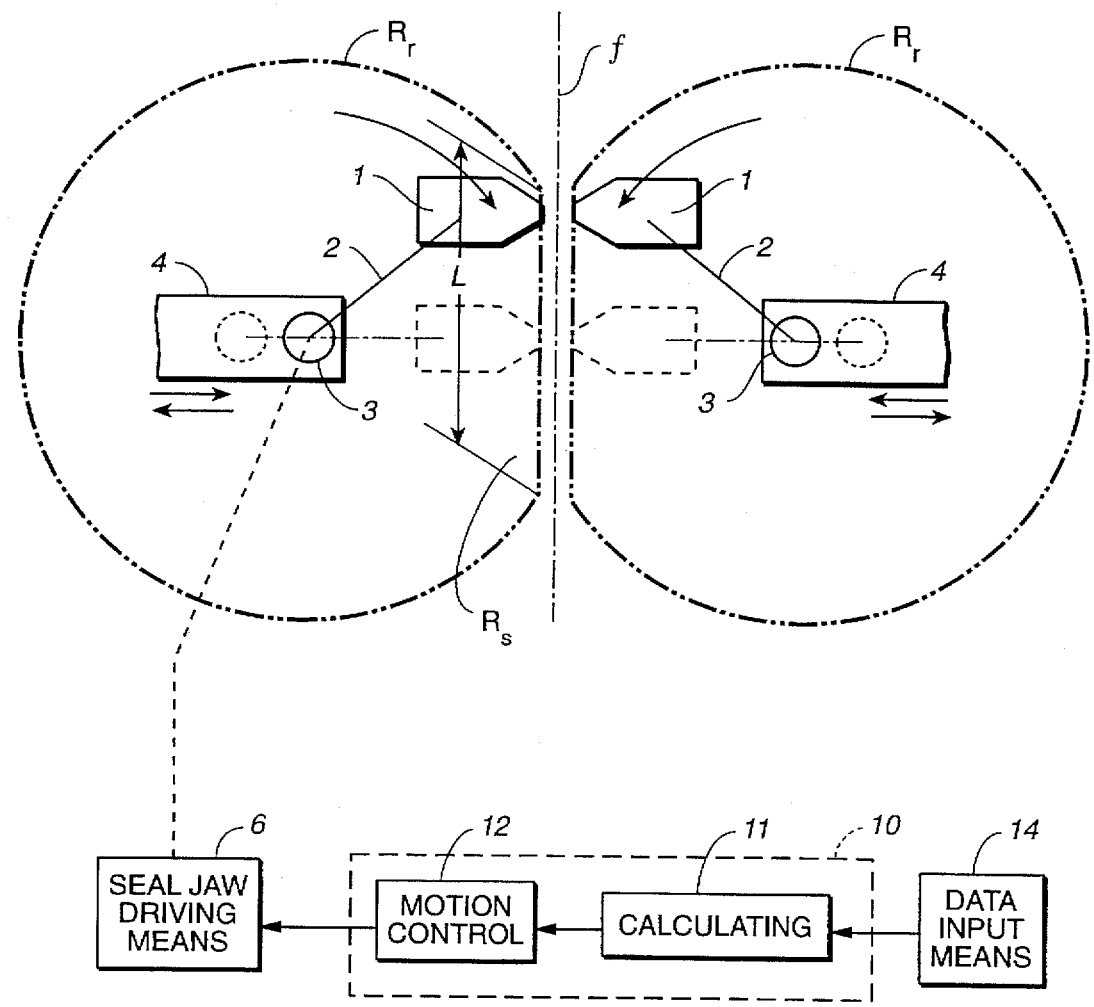
FIG._2

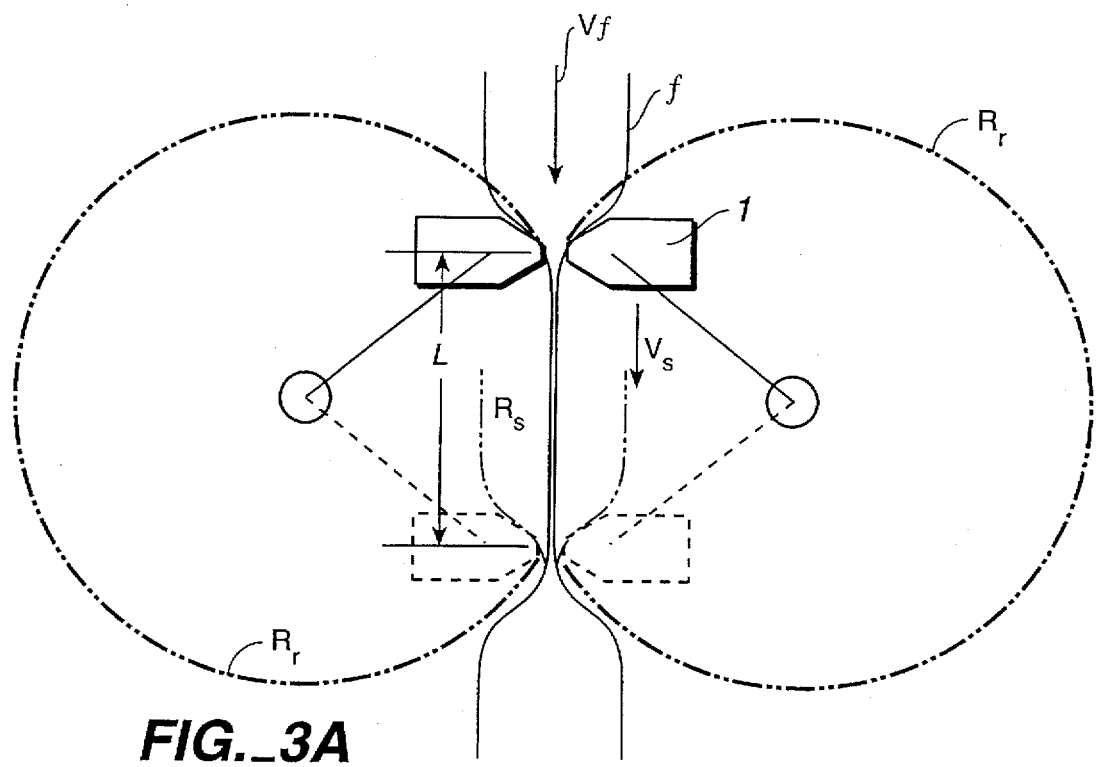
FIG._3A
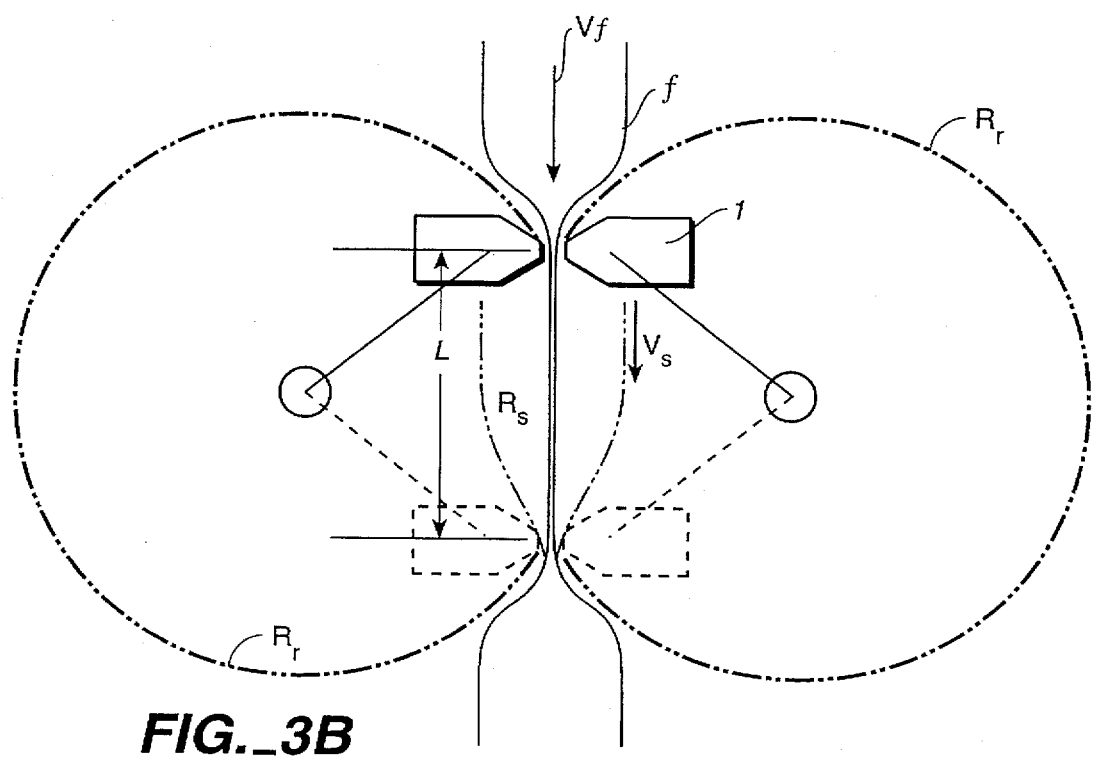
FIG._3B

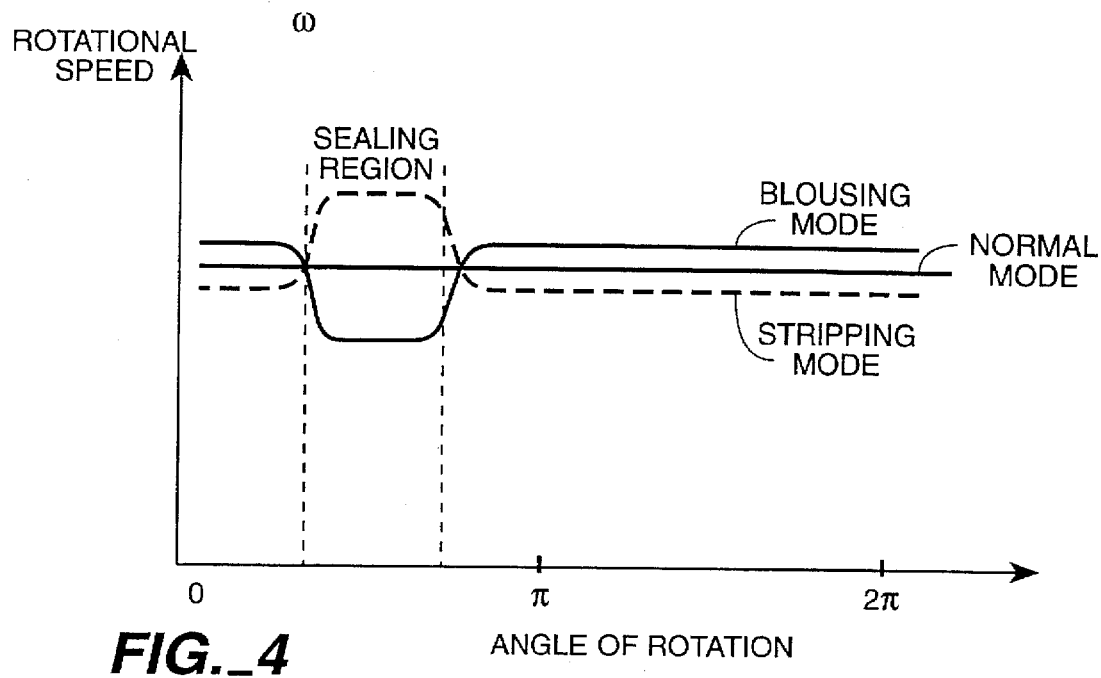
FIG._4
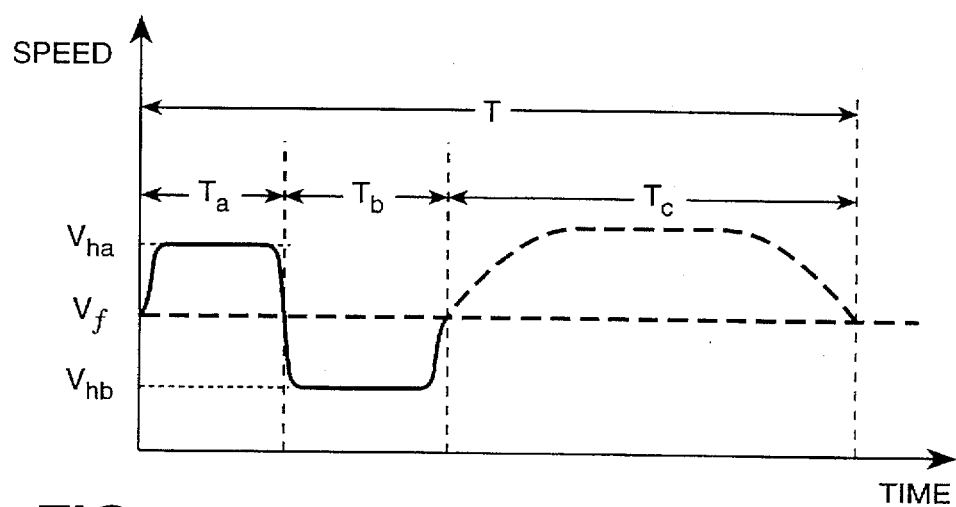
FIG._6

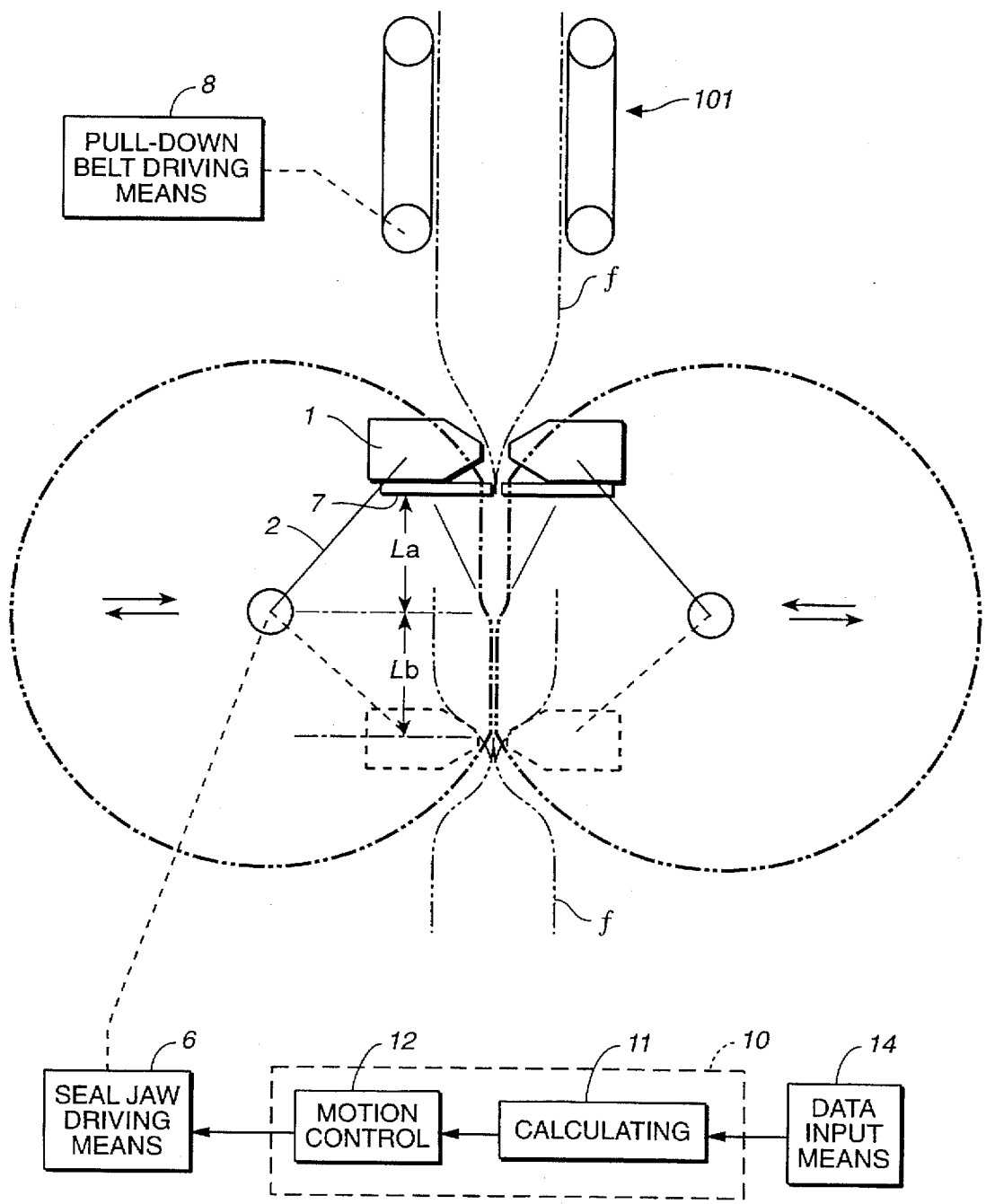
FIG._5

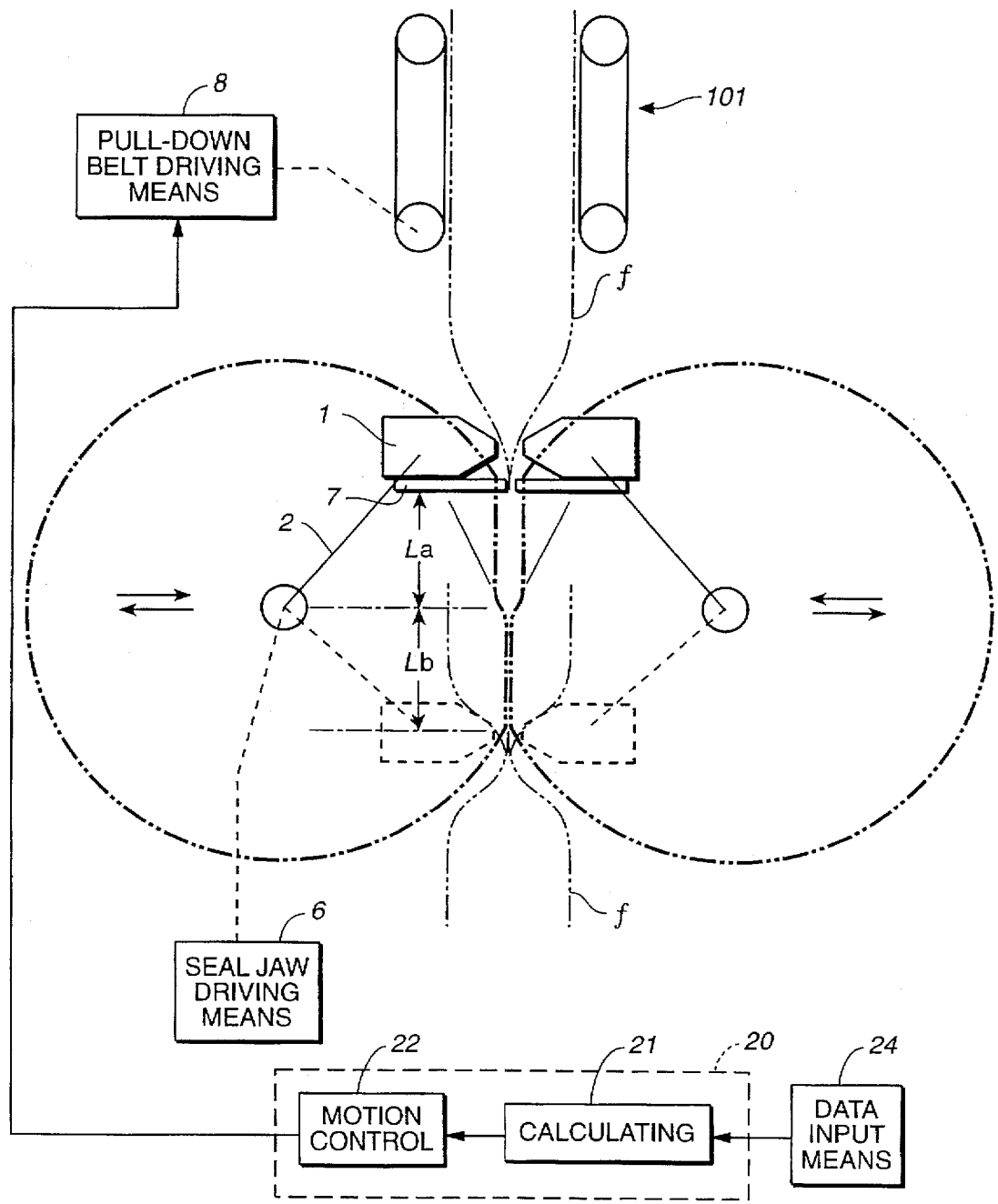
FIG._7

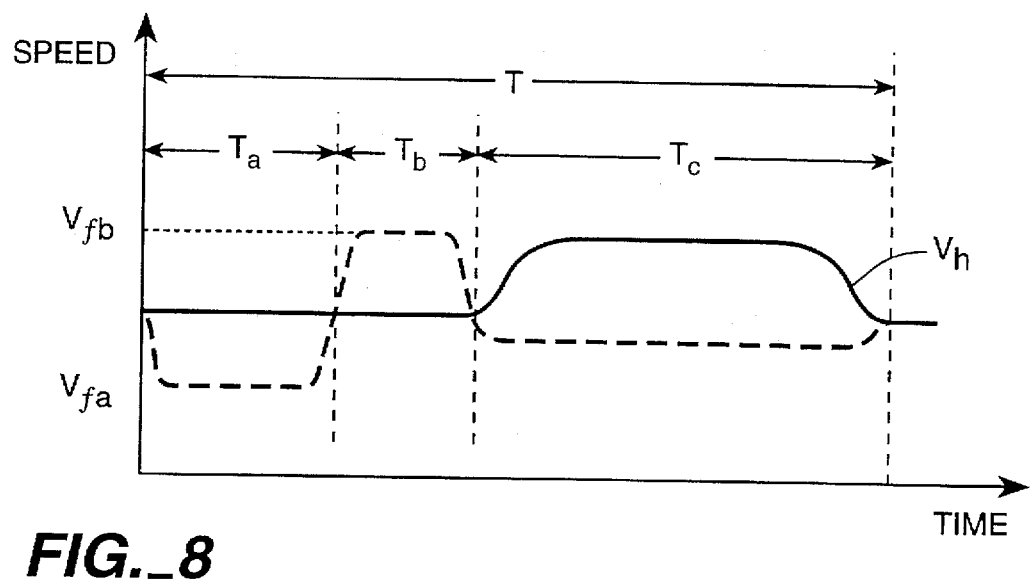
FIG._8
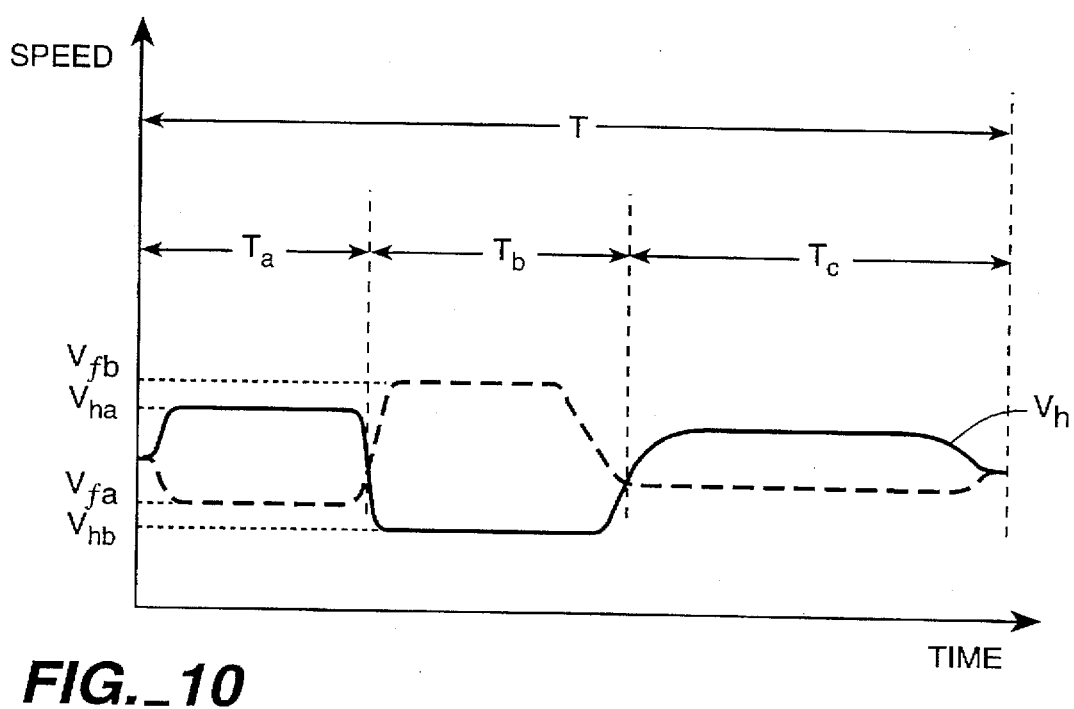
FIG._10

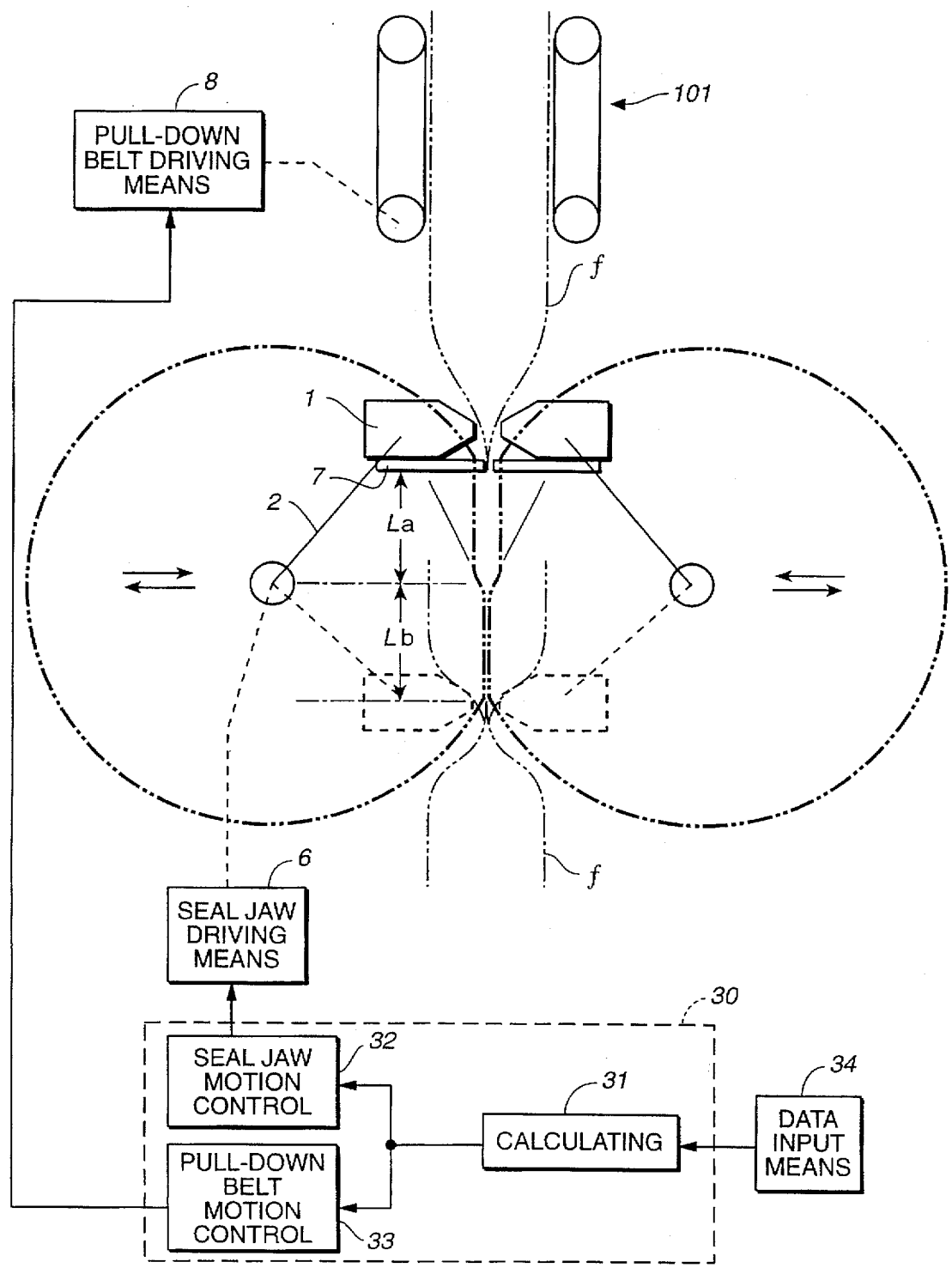
FIG._9

TRANSVERSE SEALER FOR A BAG MAKER WITH VARIABLE OPERATING SPEED

BACKGROUND OF THE INVENTION

This invention relates to a form-fill-seal bag maker-packaging machine and more particularly to such a machine of a so-called vertical pillow type. Specifically, the invention relates to a transverse sealer for such a machine operable at variable speeds of motion.

It has been known to use a vertical pillow type form-fill-seal bag maker-packaging machine (herein referred to simply as "a bag maker" generally adapted to pull down a tubularly formed flexible and elongated bag-forming material (herein referred to simply as "a film") by means of pull-down belts while sealing its mutually overlapping edge parts, to simultaneously seal the film transversely by a transverse sealer over a seal area serving both as the top of one bag and the bottom of next bag to be formed, and to produce individual filled bags by cutting the film transversely at the center of the seal area. When such a bag maker is used, the feed-in speed of the film is usually determined on the basis of the time required to fill each bag with articles to be packaged, and the transverse sealer is activated intermittently or made to move continuously along a circular trajectory as described in Japanese Patent Publication Tokkai 4-87931. If the articles to be packaged have a small volume density such as potato chips, however, they do not drop into the bag quickly or assume the lowest possible positions inside the bag. They may even rise above the seal area. In view of the above, Japanese Utility Model Publication Jikkai 6-20209 disclosed a transverse sealer with seal jaws provided with stripping plates attached below them such that the film being made into a bag is stroked downwards prior to being transversely sealed. If the film is thus stroked, however, the cross-sectional area of the portion of the tubularly formed film above the seal jaws becomes reduced, and this makes it harder for the next batch of articles being dropped into the next bag to quickly drop deeply into the bag. In other words, the stripping of one bag had a negative effect on the filling of the next bag according to the prior art technology.

SUMMARY OF THE INVENTION

It is therefore a general object of this invention to improve the productivity of a bag maker.

It is a more specific object of this invention to eliminate problems of prior art bag makers described above by providing a transverse sealer which is controlled such that even articles with a low volume density can be filled into bags more quickly.

It is another specific object of this invention to provide a transverse sealer for a bag maker, of which the speed of its seal jaws while moving along the film operation is variable.

A transverse sealer according to the present invention, with which the above and other objects can be accomplished, is generally of a kind having a pair of seal jaws at opposite sides of the vertical path a tubularly formed film which is being pulled downward and adapted to undergo a cyclic motion along generally D-shaped trajectories each including a substantially straight vertical portion along the path of the film and an arcuate return path portion. According to one embodiment of the invention, the pair of seal jaws can be moved controllably faster or slower than the speed of the film, depending on whether it is desired to effect a stripping action by stroking the film downward or to cause the film to slacken and swell, or "blouse", so as to make it easier for the articles inside to drop deeper downward toward the bottom of the bag being formed. The speed of the seal jaws along the return paths is adjusted such that the period of the cyclic motion of the seal jaws will be the same as the time required for the film to move over a distance equal to the length of the individual bags being made.

According to another embodiment of the invention, stripping plates are attached to the seal jaws so as to move ahead of the seal jaws when they move downward, and the straight-line portion of the D-shaped trajectories of the seal jaws is divided into a stripping region on the upper half and a sealing region on the bottom half. Either or both of the speeds with which the seal jaws and the film are moved downward are changed such that the speed of the seal jaws will move faster than the film in the stripping region such that the film is stripped and the film will move faster than the seal jaws in the sealing region such that the film will blouse.

A bag maker according to the present invention is characterized as incorporating a transverse sealer embodying the invention.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic diagonal view of a portion of a bag maker incorporating a transverse sealer embodying this invention;

FIG. 2 is a schematic side view of a portion of a transverse sealer embodying the invention, showing also its control unit and the motion of its seal jaws;

FIGS. 3A and 3B are schematic side views of the transverse sealer of FIG. 2, showing the effects of changing the speed of its seal jaws;

FIG. 4 is a graph of the seal jaw motion in the stripping and blousing modes of operation;

FIG. 5 is a schematic side view of a portion of another transverse sealer embodying the invention, showing also its control unit and the motion of its seal jaws;

FIG. 6 is a timing graph of the transverse sealer shown in FIG. 5;

FIG. 7 is a schematic side view of a portion of still another transverse sealer embodying the invention, showing also its control unit and the motion of its seal jaws;

FIG. 8 is a timing graph of the transverse sealer shown in FIG. 7;

FIG. 9 is a schematic side view of a portion of still another transverse sealer embodying the invention, showing also its control unit and the motion of its seal jaws; and FIG. 10 is a timing graph of the transverse sealer shown in FIG. 9.

Throughout herein, components which are substantially alike are indicated by the same numerals even if they belong to sealers according to different embodiments of the invention.

DETAILED DESCRIPTION OF THE INVENTION

FIG. 1 shows a vertical pillow type form-fill-seal packaging machine 90 as an example of bag maker incorporating a transverse sealer (only schematically illustrated at 110) controlled according to this invention. A flexible, elongated thermoplastic bag-making material f ("a film") is originally in the form of a web roll 92 supported around a shaft 95 (serving as web supporting means). The film f is pulled out of the web roll 92, is guided by a plurality of guide rolls (including dancer rollers) 105 to a former 98, of which the function is to bend the film f into a tubular shape, slides thereon to change the direction of its motion, and is pulled downward by a film-pulling unit 100 including a pair of pull-down belts 101 running parallel to each other and a longitudinal sealer in the form of a heater belt 102 for sealing together the mutually overlapping edge parts of the film f. The film f, which is now in a cylindrical form, is sealed horizontally (that is, transversely to its downward direction of motion) by the transverse sealer 110. The control unit for controlling the motions of the film-pulling unit 100 and the transverse sealer 110 are not shown in FIG. 1.

A transverse sealer according to a first embodiment of this invention is structurally similar to the one disclosed by one of the present inventors in Japanese Patent Publication Tokkai 5-77805, comprising, as shown schematically in FIG. 2, a pair of seal jaws 1 each supported at one end by one of a pair of rotary arms 2 on opposite sides of the downward path of the film f which is now tubularly formed. The rotary arms 2 are adapted to rotate around respective shafts 3 through the opposite ends thereof in mutually opposite directions and "inwardly" as seen from above such that the seal jaws 1, supported by the rotary arms 2, sandwich the film f from both sides and move downward therewith. In order to move the seal jaws 1 in generally D-shaped trajectories, the shafts 3 of the rotary arms 2 are adapted to move towards or away from each other by positive and negative rotations of a turn-buckle mechanism (schematically shown at 4). In FIG. 2, numeral 6 generally indicates seal jaw driving means controlled by a control unit 10. The approximately straight portion of the D-shaped trajectory for each seal jaw 1 is herein referred to as the sealing region $R_s$, and the arcuate portion thereof as the return path $R_r$.

The control unit 10 according to this invention is characterized as allowing the speed $V_s$ of the seal jaws 1 in the sealing region $R_s$ to be variable without the necessity of changing the period of the cyclic motion of the rotary arms 2.

Effects on the film f of varying the seal jaw speed $V_s$ in the sealing region are explained next with reference to FIGS. 3A and 3B. If the seal jaw speed $V_s$ is less than the film speed $V_f$ (with which the film f is being pulled down by the film-pulling unit 100), or if $V_s = V_f + \Delta V$ where $\Delta V < 0$, the part of the film f moving behind (or on the upstream side of) the seal jaws 1 in the sealing region becomes slackened (or "bloused") as shown in FIG. 3A. By the time the seal jaws 1 reach the bottom of the sealing region $R_s$, the tubularly formed film f is fully expanded (or bloused), making it easier even for articles with a small volume density to fall quickly towards the bottom and fill the bag being produced.

If the seal jaw speed $V_s$ is greater than the film speed $V_f$, or if $V_s = V_f + \Delta V$ where $\Delta V > 0$, on the other hand, the seal jaws 1 stroke the outer surfaces of the film f downward. This has the effect of reducing the volume of the space inside the tubular film f, as shown in FIG. 3B, but this can be advantageous because powder-like small particles remaining in the seal area are thereby removed, resulting in a more dependable seal.

Such an increase or decrease in the seal jaw speed 1 must be effected within the same period of the cyclic motion of the seal jaws 1 without affecting the other parts of the bag maker 90 such as its film transporting system or a weighing system (not shown) for the articles to be packaged. In other words, if the lengths of time required for the seal jaws 1 to travel through the entire sealing region $R_s$ (of length L) and the time required for them to then return to the top of the sealing region $R_s$ through the return path $R_r$ are denoted by $t_s$ and $t_r$, respectively, the speed of the seal jaws 1 over the return path $R_r$ must be determined such that:

$$t_s + t_r = \text{constant} = 1/n \tag{1}$$

where n is the number of bags to be produced per unit time. Since $$t_s = L/V_s = L/(V_f + \Delta V) \tag{2}$$

it can be concluded that the motion of the seal jaws 1 should be controlled such that $$t_r = 1/n - L/V_s = 1/n - L/(V_f + \Delta V). \tag{3}$$

Data such as the number n of bags to be produced per unit time and the film speed $V_f$ are inputted through a data input means, such as a keyboard, shown schematically at 14 in FIG. 2. A calculating means 11 of the control unit 10 serves to calculate not only the seal jaw speed $V_s$ in the sealing region $R_s$ but also its return speed $V_r$ over the return path $R_r$ from the data inputted through the data input means 14 and (3) given above. The data obtained by the calculating means 11 are relied upon by a seal jaw motion control means 12 to drive the seal jaw driving means 6 to move the rotary arms 2 by converting the received data into frequencies or pulse numbers in known manners both for the sealing region $R_s$ and the return path $R_r$, depending on whether AC induction or stepping motors are used for driving the rotary arms 2.

To explain more in detail how to use a bag maker with a transverse sealer thus controlled to package articles with a small volume density such as potato chips, the user may select the "blousing mode" of operation and input the length of the bags to be produced. Thereupon, the calculating means 11 reduces the seal jaw speed $V_s$ in the sealing region $R_s$ by $\Delta V$ from its value in the normal mode of operation (by reducing the rotational speed $\omega$ of the rotary arms 2) and calculates from (3) its return speed $V_r$ on the return path $R_r$, outputting these speed values to the seal jaw driving means 12. The seal jaws 1 are accordingly driven at such modified speeds as shown by the solid-line curve in FIG. 4 without changing the period of their overall cyclic motion. As a result, the part of the film f moving behind the seal jaws 1 is bloused and slackens, as shown by broken lines in FIG. 3A, allowing the articles to drop into the bag more easily and to reach its bottom more readily.

If the "stripping mode" of operation is selected, on the other hand, the seal jaw speed $V_s$ in the sealing region $R_s$ is increased instead by $\Delta v$, by increasing the rotational speed $\omega$ of the rotary arms 2 as shown by the dotted-line curve in FIG. 4, the return speed $V_r$ on the return path $R_r$ being increased to keep the overall period of cyclic motion unchanged.

As a variation of the above, the control unit 10 may be adapted to select a value of the increment $\Delta V$, depending on additional data such as the kind of the articles to be packaged or the material (or physical properties) of the film f.

An improved control according to this invention may be effected also on transverse sealers of another kind disclosed, for example, in Japanese Utility Model Publication Jikkai 6-20209 and schematically shown in FIG. 5, comprising a pair of stripping plates 7 in addition to the components of the transverse sealer described above with reference to FIGS. 2 and 3. Thus, those of the components of the transverse sealer of FIG. 5 that are substantially the same, or at least structurally and functionally similar, to those shown in FIG. 2 are indicated by the same numerals, such as the seal jaws 1, the rotary arms 2 and the seal jaw driving means 6. The seal jaw driving means 6 is adapted to cause the seal jaws 1 to move in generally D-shaped trajectories including substantially straight downward portions along the path of the film f. The pair of stripping plates 7 are set on the bottom side of the seal jaws 1 and protrudes inwardly towards each other from the internally facing surfaces of the seal jaws 1, as shown in FIG. 5 (although schematically), so as to move ahead of the seal jaws 1 when they move downward on the straight downward portion of their generally D-shaped trajectories.

According to this embodiment of the invention, the aforementioned straight portion of the D-shaped trajectories of the seal jaws 1 is divided into a stripping region where the stripping plates 7 strip the film from both sides and a sealing region where transverse sealing of the film f is effected, the sealing region being below the stripping region such that the seal jaws 1 and the stripping plates 7 traverse the stripping region before the sealing region in each cycle. The lengths of the stripping and sealing regions are indicated by symbols $L_a$ and $L_b$, respectively, in FIG. 5.

On the basis of data inputted through the data inputting means 14 such as the number n of bags desired to be produced per unit time, the length of each bag to be produced, the sealing time $T_b$ (required for the seal jaws 1 to cover the distance $L_b$ of the sealing region) and the stripping distance (defined as the longitudinal distance over which each bag is stripped), the control unit 10 controls the seal jaw driving means 6, according to calculations carried out by the calculating means 11 and through a motion control means 12, such that the speed $V_{ha}$ of the vertical motion of the stripping plates 7 (and hence also that of the seal jaws 1) in the stripping region will be greater than the film speed $V_f$ (equal to n times the length of each bag) by which the film f is pulled down by the pull-down belts 101 (such as $V_{ha}=1.5V_f$) and that the speed $V_{hb}$ of the vertical motion of the stripping plates 7 in the sealing region will be less than $V_f$ (such as $V_{hb}=L_b/T_b=0.5V_f$) in the stripping region.

The mode of operation described above is schematically illustrated in FIG. 6 by a timing graph wherein $T_a$ indicates the stripping time (=$L_a/V_{ha}$) required for the seal jaws 1 to cover the distance $L_a$ of the stripping region and T (=1/n) is the period of the cyclic operation of the bag maker including the return time $T_c$ required for the seal jaws 1 to travel on the arcuate parts of their trajectories from the end (at the bottom) of the sealing region back to the beginning (at the top) of the stripping region. For making 90bags of length 195 mm per minute by requiring a sealing time $T_b$ of 120 msec and setting the stripping distance to be 20 mm, for example, it may be determined that $V_f$=292 mm/sec and the transverse sealer may be controlled such that $T_a$=68 msec, $V_{ha}$=438 mm/sec and $V_{hb}$=146 mm/sec. The calculating means 11 also serves to set the speed of the seal jaws 1 on their return paths such that the period of the cyclic motion of the seal jaws 1 does not have to be modified, or such that the seal jaws 1 can make one complete turn on their D-shaped closed trajectories while the film f travels the distance equal to the length of each bag to be produced. Since the seal jaws 1 are separated from the film f on their return paths, neither stripping nor sealing the film f, the speed of the seal jaws 1 on the return paths is indicated only schematically and by a dotted line in FIG. 6.

With the motion of the seal jaws 1 thus controlled, the film f is well squeezed by the time it reaches the end (bottom) of the stripping region but is well rounded by the time it approaches the end (bottom) of the sealing region. This makes it possible to fill the bags quickly even with articles having a small volume density such as potato chips, while preventing small pieces thereof from getting caught between the seal jaws 1 as they effect transverse sealing. As a result, the package-forming operation can be carried out with extra time to spare and the period of the cyclic operation of the bag maker can be reduced. In other words, the overall efficiency of the packaging operation can be improved.

FIGS. 7 and 8 show another way of controlling the operation of a transverse sealer structured substantially identically or at least similarly as described above.

Another control unit 20 for a similarly structured transverse sealer is schematically shown in FIG. 7. In this transverse sealer, the motion of the seal jaws 1 is so controlled that the speed of their downward motion on the straight portions of their generally D-shaped trajectories is constant $V_h$ across both the stripping and sealing regions, as indicated by the solid-line curve in FIG. 8. Data such as the number n of bags to be produced per unit time and the blousing of the film f are inputted through a data input means 24 and used by a calculating means 21 to determine the speed of motion of the film f such that its downward speed $V_{fa}$ while the seal jaws 1 are in the stripping region is less than $V_h$ and that its speed $V_{fb}$ while the seal jaws 1 are in the sealing region is greater than $V_h$, as indicated by the dotted-line curve in FIG. 8. The control unit 20 controls the motion of the pull-down belts 101 (through pull-down belt driving means schematically shown at 8 in FIG. 7, as well as in FIG. 5), rather than the seal jaw driving means 6. The control unit 20 also determines the speed of the film while the seal jaws 1 are on the return paths such that the period of the cyclic motion of the seal jaws 1 will be the same as the time required for the film f to be pulled down by a distance equal to the length of each bag being produced. The speeds of the film and the seal jaws 1 while the seal jaws 1 are on their return paths are only schematically represented in FIG. 8. It is to be understood, however, that the area under the dotted-line curve in FIG. 8 corresponding to one cycle of operation must represent the length of the bag. In FIG. 7, numeral 22 indicates a means for controlling the motion of the pull-down belt driving means 8 according to the results of calculation by the calculating means 21.

Still another control unit 30 for a similarly structured transverse sealer is schematically shown in FIG. 9, adapted to change the speeds of both the seal jaws 1 (through the seal jaw driving means 6) and the film f (through the pull-down belt driving means 8) such that the speed of the seal jaws $V_{ha}$ in the stripping region is greater than the film speed $V_{fa}$ and that their speed $V_{hb}$ in the sealing region is less than the film speed $V_{fb}$ in that region, as shown in FIG. 10. The speeds of the seal jaws 1 and the film f while the seal jaws 1 are on their return paths are calculated by a calculating means 31 such that the period of the cyclic motion of the seal jaws 1 will be the same as the time required for the film f to be pulled down by a distance equal to the length of each bag being produced. The speeds of the film and the seal jaws 1 while the seal jaws 1 are on their return paths are only schematically represented in FIG. 10. It is to be remembered again that the area under the dotted-line curve in FIG. 10 corresponding to one cycle of operation must represent the length of the bag. In FIG. 9, numerals 32 and 33 respectively indicate means for controlling the motion of the seal jaws driving means 6 and the pull-down belt driving means 8 according to the results of calculations by the calculating means 21.

Although the present invention has been described with reference to only a limited number of examples, they are not intended to limit to scope of the invention. The description of the specification is intended to be interpreted broadly. For example, although the stripping and sealing regions were described sometimes simply as being the top and bottom half of the vertical portion of a D-shaped trajectory, they need not be exactly one-half each, that is, $L_a$ and $L_b$ are not required to be equal lengths. All modifications and variations of the disclosed embodiments that may be apparent to a person skilled in the art are intended to be included within the scope of the invention.

What is claimed is:

1. A transverse sealer for transversely sealing an elongated tubular film moving on a specified film path, said transverse sealer comprising:

a pair of sealing units disposed on opposite sides of said film path, said pair of sealing units being adapted to undergo cyclic motion and transversely seal said film to thereby form a bag while moving on an adjacent path along said film path in said cyclic motion, said adjacent path including a stripping region in which said sealing units serve to strip said film and a sealing region where said sealing units transversely seal said film, said sealing units passing said stripping region immediately before passing said sealing region in said cyclic motion; and a control unit for controlling variations in speed of motion of said sealing units, causing said sealing units to move faster than said film in said stripping region and slower than said film in said sealing region without changing the period of said cyclic motion.

2. The transverse sealer of claim 1 wherein said control unit causes said sealing units to move faster in said stripping region than in said sealing region.

3. The transverse sealer of claim 1 wherein said film moves at a constant speed on said film path, and said control unit causes said sealing units to move faster in said stripping region than in said sealing region.

4. The transverse sealer of claim 1 wherein said control unit causes said film to move faster while said sealing units are in said sealing region than when said sealing units are in said in said stripping region.

5. A bag maker adapted to bend an elongated bag-making film into a tubular shape to form a bag and to simultaneously fill said bag with a batch of articles, said bag maker comprising:

a web supporting means supporting a web roll having a web of said elongated film wound around a core shaft;

a former for forming said web into a tubular shape;

web guiding means for guiding said web from said web roll to said former and said tubularly formed web on a longitudinal downward film path;

a longitudinal sealer for sealing side edges of said tubularly formed web longitudinally;

a film pulling means for causing said film to move on said downward film path; and a transverse sealer which comprises:

a pair of sealing units disposed on opposite sides of said film path, said pair of sealing units being adapted to undergo cyclic motion and transversely seal said film to thereby form a bag while moving on an adjacent path along said film path in said cyclic motion, said adjacent path including a stripping region in which said sealing units serve to strip said film and a sealing region where said sealing units transversely seal said film, said sealing units passing said stripping region immediately before passing said sealing region in said cyclic motion; and a control unit for controlling variations in speed of motion of said sealing units, causing said sealing units to move faster than said film in said stripping region and slower than said film in said sealing region without changing the period of said cyclic motion.

6. The bag maker of claim 5 wherein said film pulling means pulls said film at a constant speed and said control unit causes said sealing units to move faster in said stripping region than in said sealing region.

7. The bag maker of claim 5 wherein said control unit causes said film pulling means to move said film faster when said sealing units are in said sealing region than when said sealing units are in said stripping region.

8. A transverse sealer for transversely sealing an elongated tubular film moving on a specified film path, said transverse sealer comprising:

sealing means for undergoing a continuous cyclic motion along a closed trajectory consisting of a sealing region which is along said film path and a non-sealing region and transversely sealing said film only while moving in said sealing region in said cyclic motion; and a control unit for varying the speeds of motion of said sealing means and said film in said cyclic motion without changing the period of said cyclic motion such that said sealing means and said film move at different speeds in said sealing region.

9. The transverse sealer of claim 8 further comprising driving means for causing said sealing means to move on said closed trajectory, said trajectory being approximately D-shaped, including a substantially straight part corresponding to said sealing region and an arcuate part corresponding to said non-sealing region.

10. The transverse sealer of claim 8 wherein said control unit determines speeds of said sealing means in said sealing and non-sealing regions on the basis of the speeds of said film along said film path in said sealing and non-sealing regions.

11. A bag maker adapted to bend an elongated bag-making film into a tubular shape to form a bag and to simultaneously fill said bag with a batch of articles, said bag maker comprising:

a web supporting means supporting a web roll having a web of said elongated film wound around a core shaft;

a former for forming said web into a tubular shape;

web guiding means for guiding said web from said web roll to said former and said tubularly formed web on a longitudinal downward film path;

a longitudinal sealer for sealing side edges of said tubularly formed web longitudinally together;

a film pulling means for causing said film to move on said downward film path; and a transverse sealer which comprises:

sealing means for undergoing a continuous cyclic motion along a closed trajectory consisting of a sealing region which is along said film path and a non-sealing region and transversely sealing said film only while moving in said sealing region in said cyclic motion; and a control unit for varying the speeds of motion of said sealing means and said film in said cyclic motion without changing the period of said cyclic motion such that said sealing means and said film move at different speeds in said sealing region.

12. The bag maker of claim 11 further comprising driving means for causing said sealing means to move on said closed trajectory, said trajectory being approximately D-shaped, including a substantially straight part corresponding to said sealing region and an arcuate part corresponding to said non-sealing region.

13. The bag maker of claim 11 wherein said control unit determines speeds of said sealing means in said sealing and non-sealing regions on the basis of the speeds of said film along said film path in said sealing and non-sealing regions.

* * * * *